L. S. THORNESS.
FRUIT PICKER.
APPLICATION FILED FEB. 24, 1919.
1,329,481.
Patented Feb. 3, 1920.
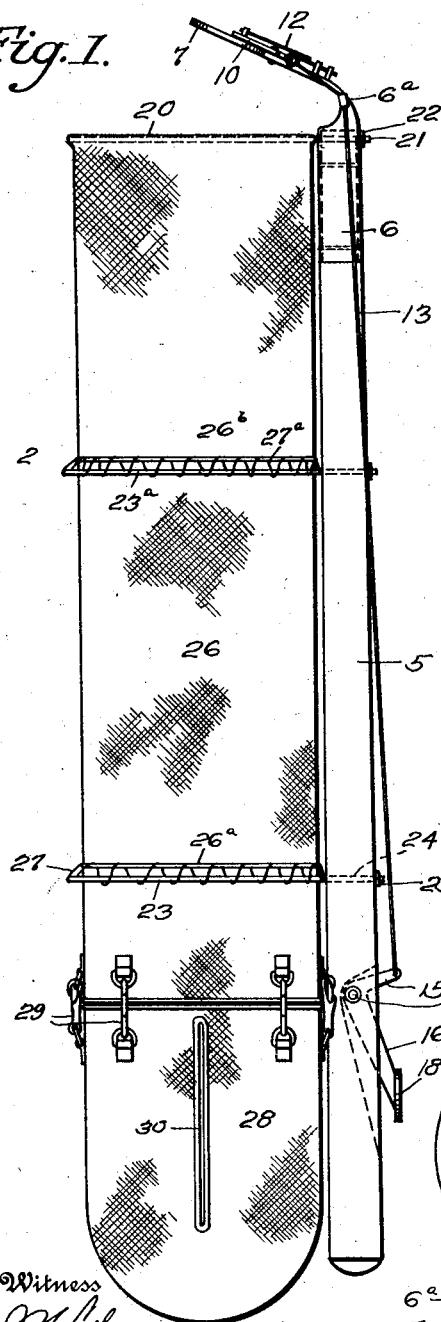
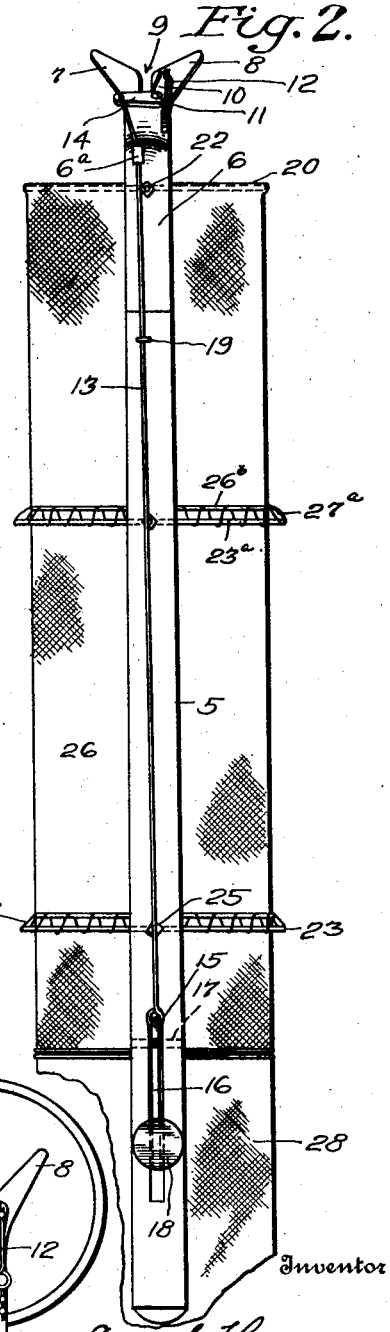

UNITED STATES PATENT OFFICE.

LOUIS SYLVESTER THORNESS, OF TACOMA, WASHINGTON.

FRUIT-PICKER.

1,329,481.      Specification of Letters Patent.      Patented Feb. 3, 1920.

Application filed February 24, 1919. Serial No. 278,894.

*To all whom it may concern:*

Be it known that I, LOUIS SYLVESTER THORNESS, a citizen of the United States, residing at Tacoma, in the county of Pierce and State of Washington, have invented certain new and useful Improvements in Fruit-Pickers, of which the following is a specification.

This invention relates to fruit pickers and it has for its object the provision of an improved device of this character by means of which fruits may be more expeditiously and safely harvested than by any device heretofore available.

In order that the advantages of this device may be appreciated it should be remembered that in harvesting fruit it is not alone necessary to dislodge the fruit but it is equally as important to deliver it to the receiving receptacles absolutely without such shock or jar as would bruise it, because bruises result in quick rotting of the fruit.

In order to efficiently accomplish the foregoing result, the present invention is so designed as to provide:

*a.* A cutting off mechanism adapted to sever the stem of the fruit to thereby release the same from the tree without such agitation or shaking of the branches of the tree as would be likely to dislodge adjacent fruits;

*b.* An operating mechanism for the cutting off mechanism adapted to be operated by the pressure of the thumb so that the device may be held and operated by one hand, leaving the other hand free to catch the fruit; and

*c.* A chute by which the fruit is directed into the hand of the operator, said chute being provided with a lateral opening through which the hand of the operator may be inserted, as will be hereinafter set forth.

In the accompanying drawing in which like characters of reference designate corresponding parts—

Figure 1 is a side elevation of my improved fruit picking device;

Fig. 2 is a rear elevation thereof; and

Fig. 3 is a plan view.

In the drawing, 5 designates a light wooden handle carrying at its upper end a ferrule 6 which terminates in a pair of spaced wing-like plates 7 and 8, the space between which, indicated at 9, serves to receive the stems of the fruit, which stems are guided thereinto by the plates 7 and 8. A knife 10 is pivoted at 11 and moves across the space 9 and serves to cut the stems of the fruit. A spring 12 serves to retract this knife. A wire 13 is connected at one end to an arm 14 of knife 10 and at its opposite end to one of the arms 15 of a bell crank lever 16, the latter being pivoted at 17 in a cut-out portion of the handle 5. The terminal end of the lever 16 is provided with a pad or button 18 which lies in such position with relation to the handle 5 that the said pad or button may be pressed by the thumb of the operator while the structure as a whole is held in the hand. The wire 13 is preferably guided around the bend of the ferrule 6 by means of a guide clip 6$^a$. This wire may be additionally guided by suitable eyelets 19 carried by handle 5.

Disposed at such distance below the plates 7 and 8 as to permit the fruit to pass freely therethrough is a ring 20, a shank 21 of which passes through the handle and is secured therein by a nut 22. A like ring 23 is disposed adjacent the lower part of the handle and is held in place by a shank 24 and nut 25. The ring 23 is larger in diameter than ring 20. A fabric chute 26 has its upper end secured to the ring 20 and is provided adjacent the ring 23 with a reinforcing cord 26$^a$ which extends therearound. A lacing 27 engages ring 23 and cord 26$^a$ and serves to hold the fabric chute concentrically within the ring 23, so that sagging of the chute will be prevented and at the same time bruising of the fruit by contact with ring 23 will be guarded against. If desired, an additional ring 23$^a$, cord 26$^b$ and lacing 27$^a$, corresponding to the parts 23, 26$^a$ and 27 may be provided intermediate the length of the chute. A bag 28 may be secured by suitable snap-hooks 29 to the lower end of the chute, said bag being provided with a hand-hole 30 through which the hand of the operator may be thrust. This bag serves to receive the fruit when it becomes necessary for the operator to use both hands in engaging the cutting-off mechanism with a stem located in an inconvenient position or when for any other reason it is inconvenient for the operator to hold one hand in position to catch the fruit.

From the foregoing description it will be seen that the objects sought are efficiently attained by means of the structure shown and described. However, it is to be understood that the invention is not limited to the precise construction set forth but that it includes within its purview whatever changes fairly come within either the spirit or the terms of the appended claims.

Having described my invention, what I claim is:

1. A device of the character described, comprising a supporting handle, a ferrule mounted upon the upper end thereof and terminating in a pair of spaced flaring plates, a knife operating across the space between said plates, an operating handle carrying a thumb engaging piece pivoted in the handle adjacent the lower end thereof, a connection between the operating handle and the knife and a spring for normally maintaining the knife in retracted position, an open mouth fabric chute supported from the handle beneath the space between the plates and having a closed bag-like bottom, the latter having an elongated handhole in the side thereof and means for detachably connecting the bag-like bottom to the chute.

2. A structure as recited in claim 1 in combination with rings carried by the handle and surrounding the chute and of such diameter as to lie in spaced relation to the chute and means for holding the chute concentrically within said rings.

In testimony whereof I affix my signature.

LOUIS SYLVESTER THORNESS.